(No Model.)
D. P. ARNILLAS.
BOTTLE.
No. 603,017. Patented Apr. 26, 1898.
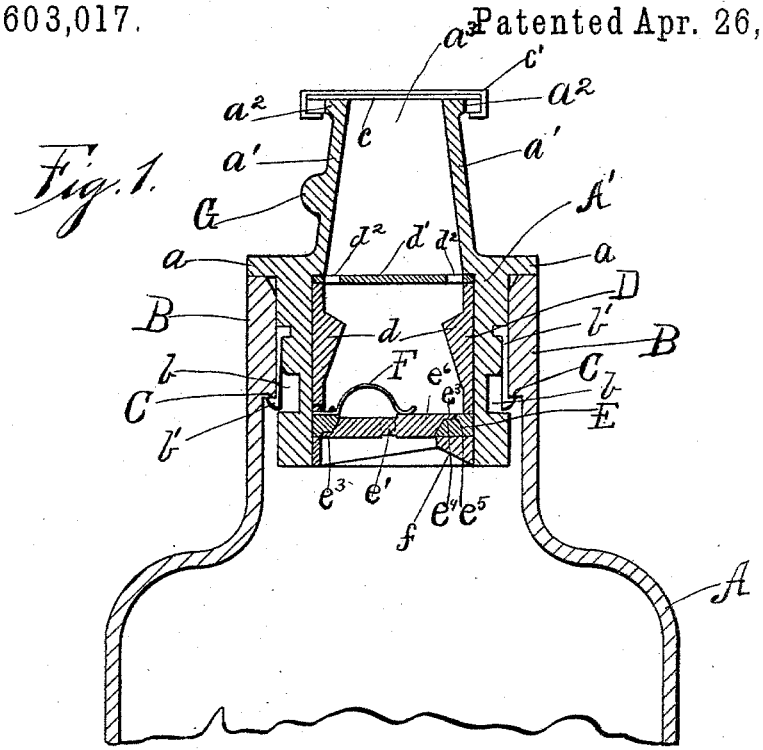
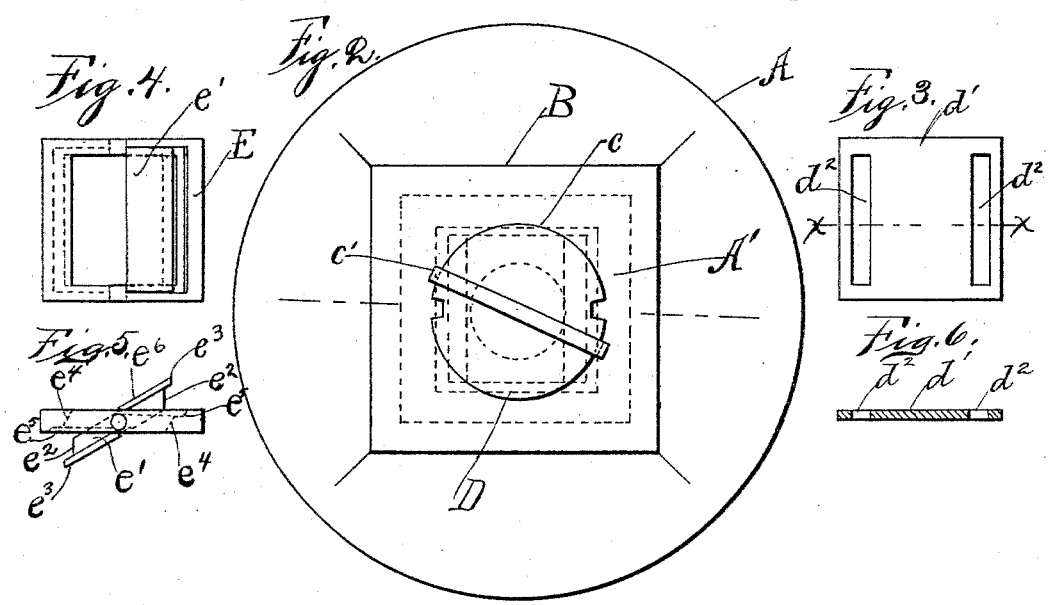
WITNESS
Milton T. Weston.
M. G. McClean
INVENTOR
Desiderio P. Arnillas,
BY
Bart Deemer & Co
ATTORNEYS

UNITED STATES PATENT OFFICE.

DESIDERIO PASCUAL ARNILLAS, OF SANTIAGO, CUBA.

BOTTLE.

SPECIFICATION forming part of Letters Patent No. 603,017, dated April 26, 1898.

Application filed August 12, 1897. Serial No. 647,960. (No model.)

*To all whom it may concern:*

Be it known that I, DESIDERIO PASCUAL ARNILLAS, a subject of the King of Spain, and a resident of Santiago, Cuba, have invented certain new and useful Improvements in Bottles, of which the following is a specification, reference being had to the accompanying drawings, forming a part thereof, in which similar letters of reference indicate corresponding parts.

This invention relates to improvements in bottles; and the object thereof is to provide the glass bottles that are to be used for containing various kinds of liquors with a closure which shall prevent the refilling of the same after the original contents have been emptied.

The invention consists in a casing which is fitted in the neck of the bottle in such a manner that when once seated it cannot be extracted without breaking the neck and also in devices secured in the casing which will permit the outflow of the contents from the bottle, but will not allow inflow of liquids to it, access to the valve mechanism being impossible through the outlet-passages thereof, means being provided to prevent the introduction of instruments for that purpose.

The invention will be hereinafter fully described, and specifically set forth in the annexed claims.

In the accompanying drawings, forming part of this specification, Figure 1 is a vertical sectional elevation showing my device in position in a bottle. Fig. 2 is a top view showing the sealing-cap. Fig. 3 is a plan view of the top or outlet of the closure. Fig. 4 is a plan of the bottom part, which carries the valve. Fig. 5 is an end view of the same, showing the valve opened; and Fig. 6 is a vertical section of Fig. 3, taken on the line $x\,x$.

In this example of my invention I have illustrated the bottle A as having a square or rectangular neck portion B, and interiorly upon the opposite side walls of the said neck are produced rectangular flanges or shoulders C. A casing A', produced from any suitable material and of rectangular configuration, having lateral flanges $a$ extended from the body portion thereof, is fitted in the neck of the bottle, the flanges resting upon its top. The casing is extended upwardly from the flanges in conical form, as at $a'$, and the upper edge of this extended portion is provided with an annular flange or bead $a^2$. An interior recess is formed in the casing A' for the reception of the valve and outlet mechanism. In the exterior of two opposite side walls of the casing A' are formed the recesses $b$, and at suitable points in said walls above said recesses are secured spring-catches $b'$, which depend at the side of the casing and enter said recesses when compressed, and when the casing A' is inserted in the neck B and pushed downwardly therein a sufficient distance the spring-catches will be released from the recesses and engage the shoulders C and retain the casing within the neck. When it is desired to seal the outlet of the casing $a^3$, a metallic cap $c$, having notches therein, is placed over the aperture and a flanged locking-bar $c'$ is rotated upon the same to engage the bead $a^2$ and lock the cap $c$ in position. Secured interiorly of the said casing I provide a device which, while it effectually closes the bottle, will permit the contents to flow out and embodies a shell or casing D, having zigzag interior side walls $d$, a top wall or portion $d'$, having two opposite passage-ways or outlets $d^2$, and a bottom part E, having a central aperture or opening $e$, in opposite sides of which is journaled a swinging valve or gate $e'$, the said gate being beveled at each end, as at $e^2$, and having end and side flanges $e^3$ upon its top and bottom surfaces, which beveled and flanged ends fit into corresponding bevels $e^4$ and recesses $e^5$, formed in the opening $e$, in which the valve $e'$ operates. By this construction the valve can be opened only in the direction required to permit the liquid in the bottle to flow out when inverted, as it will be apparent that when the bottle is in a vertical position the pivoted valve will by gravity drop into its seat and close the passage, the upwardly-opening side of the valve being made heavier, as at $e^6$, than the other side. Upon the surface of the lower part of the casing I also attach a light bow-spring F, the free end of which bears upon the upper surface of the valve and serves to make the action of the valve more certain.

The operating parts of the aforesaid valve device having been assembled form an interior casing which is inserted in the lower end of the casing A' and secured therein by means of the piece $f$, inserted in the space below the valve device and attached thereto by cement.

Rubber strips or bands may be inserted between the two casings to make tight joints. Upon one side of the conical top portion of the casing is inserted or attached a colored glass ball G or other object to indicate the direction in which the bottle should be inclined when it is desired to pour out any of its contents.

The operation of the device is as follows: The bottle having been filled, the external casing, with its valve mechanism secured therein, is inserted in the neck of the bottle until the spring-catches engage the shoulders in the neck, which will close the bottle securely. To pour out the contents, the bottle is inverted, when the pressure of the liquid will act upon the under surface of one side of the swinging valve and open the outlet, air entering the bottle at the other side. The liquid will flow into the chamber and out through the passage-ways in the top portion. When the bottle is returned to its normal vertical or to an inclined position, the weighted swinging valve will drop into its seat from its own gravity, and its closing will be insured by the pressure of the bow-spring upon it, the spring used being light enough to yield to the pressure of the valve and the weight of outflowing liquid. Owing to the zigzag shape of the walls of the chamber no instrument can reach the valve, and the valve itself will always remain in close connection with its seat unless the bottle is inverted.

I do not confine myself to the precise form of the parts or materials comprising this apparatus as set forth, as it is evident that the various parts may be varied in shape according to the shape of the neck of the bottle without departing from the spirit of my invention.

Having thus described my invention, what I claim as new, and desire to secure by Letters Patent, is—

1. In a non-refillable-bottle attachment for bottles, embodying an outer casing secured in the neck thereof, an interior casing comprising a chamber having zigzag side walls, outlet-passages in the top and a bottom passage leading into said chamber; a centrally-pivoted weighted valve having flanges on the upper side thereof seated in said passage, substantially as shown and described.

2. A non-fillable attachment for bottles, comprising a casing having a top extension, means for sealing the same and an indicating device thereon, lateral flanges extended from the walls thereof, recesses in two opposite walls, spring-catches depending over said recesses, a valve and outlet mechanism secured in said casing forming a compartment and embodying zigzag side walls, a top part having passage-ways therein leading into the casing and a bottom part having an outlet communicating with the body of the bottle, a weighted valve pivoted in said outlet and a spring secured in the bottom part of the compartment bearing upon said valve, in combination with a bottle having internal flanges in the neck thereof, substantially as shown and described.

In testimony that I claim the foregoing as my invention I have signed my name, in presence of two witnesses, this 29th day of July, A. D. 1897.

DESIDERIO PASCUAL ARNILLAS.

Witnesses:
BEUNAVENTURE CRUZ,
V. V. HERNANDES.